United States Patent
Du et al.

(10) Patent No.: US 12,538,160 B2
(45) Date of Patent: Jan. 27, 2026

(54) REPORTING DELAY FOR CELL ACTIVATION

(71) Applicant: NOKIA TECHNOLOGIES OY, Espoo (FI)

(72) Inventors: Lei Du, Beijing (CN); Lars Dalsgaard, Oulu (FI); Parham Kazemi, Espoo (FI); Bent Henneberg Rysgaard, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/921,753

(22) Filed: Oct. 21, 2024

(65) Prior Publication Data

US 2025/0106672 A1    Mar. 27, 2025

Related U.S. Application Data (63) Continuation of application No. PCT/CN2023/122230, filed on Sep. 27, 2023.

(51) Int. Cl.
*H04W 24/10* (2009.01)
*H04B 17/318* (2015.01)

(52) U.S. Cl.
CPC .......... *H04W 24/10* (2013.01); *H04B 17/328* (2023.05)

(58) Field of Classification Search
CPC .............................. H04W 24/10; H04B 17/328
See application file for complete search history.

(56) References Cited

U.S. PATENT DOCUMENTS

2021/0251040 A1* 8/2021 Tang .................. H04W 56/001
2022/0046735 A1   2/2022 Wang et al.
(Continued)

FOREIGN PATENT DOCUMENTS

| CN | 115668794 A | 1/2023 |
| EP | 3893545 A1 | 10/2021 |
| WO | 2023/116379 A1 | 6/2023 |

OTHER PUBLICATIONS

International Search Report and Written Opinion dated Jun. 19, 2024 corresponding to International Patent Application No. PCT/CN2023/122230.

(Continued)

*Primary Examiner* — Sujoy K Kundu
*Assistant Examiner* — Raul Rivas
(74) *Attorney, Agent, or Firm* — SQUIRE PATTON BOGGS (US) LLP (57) ABSTRACT

Embodiments of the present disclosure relate to a reporting delay for cell activation. In an aspect, a terminal device receives from a network device, a cell activation command for activation of the cell. The terminal device determines a time period for reporting layer 3 (L3) measurement for the activation of the cell based on one of (i) transmitting of a report from the terminal device, (ii) receiving of a command from the network device, or (iii) information for determining the time period received from the network device. Then the terminal device transmits the L3 measurement to the network device within the time period. As such, the terminal device can determine a time period to be used for reporting L3 measurement upon cell activation command and transmits L3 report to the network device within the time period.

12 Claims, 9 Drawing Sheets

(56) References Cited

U.S. PATENT DOCUMENTS

2022/0095125 A1* 3/2022 Xiao .................. H04B 7/022
2023/0096588 A1 3/2023 Yang et al.

OTHER PUBLICATIONS

3GPP TS 38.133 V18.2.0 (Jun. 2023), Technical Specification, 3rd Generation Partnership Project; Technical Specification Group Radio Access Network; NR; Requirements for support of radio resource management (Release 18), Jun. 2023.

* cited by examiner

FIG. 9

REPORTING DELAY FOR CELL ACTIVATION

CROSS-REFERENCE TO RELATED APPLICATION

This application is a Continuation of International Patent Application No. PCT/CN2023/122230, filed Sep. 27, 2023, the contents of which are hereby incorporated by reference in their entirety.

FIELD

Various example embodiments relate to the field of communication and in particular, to a terminal device, a network device, methods, apparatuses and a computer readable storage medium for determining a reporting delay for cell activation.

BACKGROUND

In new radio (NR)—as in long term evolution (LTE), a cell can be activated or deactivated. The transitions between activated and deactivated status are mainly based on medium access control (MAC) Control Elements (CE) commands from the network e.g. the cell activation/deactivation command. When the user equipment (UE) activates a deactivated cell, it takes time to transition from deactivated to activated status. Radio access network 4 (RAN4) defines the delay requirements within which the UE shall be able to activate a deactivated cell, upon receiving cell activation command in slot n, no later than a time period.

SUMMARY

In general, example embodiments of the present disclosure provide a solution for determining a reporting delay for cell activation delay reduction. With this solution, the terminal device determines a time period to be used for reporting layer 3 (L3) measurement upon cell activation command and transmits L3 report to the network device within the time period.

In a first aspect, there is provided a terminal device. The terminal device comprises at least one processor and at least one memory storing instructions. The instructions, when executed by the at least one processor, cause the terminal device at least to: receive, from a network device, a cell activation command for activation of the cell; determine a time period for reporting layer 3 (L3) measurement for the activation of the cell based on one of (i) transmitting of a report from the terminal device, (ii) receiving of a command from the network device, or (iii) information for determining the time period received from the network device; and transmit the L3 measurement to the network device if there is uplink resource available within the time period.

In a second aspect, there is provided a network device. The network device comprises at least one processor and at least one memory storing instructions. The instructions, when executed by the at least one processor, cause the network device at least to: transmit, to a terminal device, a cell activation command for activation of the cell; and receive a layer 3 (L3) measurement for the activation of the cell from the terminal device within a time period, wherein the time period is determined based on one of (i) receiving of a report from the terminal device, (ii) transmitting of a command to the terminal device, or (iii) information for determining the time period transmitted to the terminal device.

In a third aspect, there is provided a method implemented at a terminal device. The method comprises receiving, from a network device, a cell activation command for activation of the cell; determining a time period for reporting layer 3 (L3) measurement for the activation of the cell based on one of (i) transmitting of a report from the terminal device, (ii) receiving of a command from the network device, or (iii) information for determining the time period received from the network device; and transmitting the L3 measurement to the network device if there is uplink resource available within the time period.

In a fourth aspect, there is provided a method implemented at a network device. The method comprises transmitting, to a terminal device, a cell activation command for activation of the cell; and receiving a layer 3 (L3) measurement for the activation of the cell from the terminal device within a time period, wherein the time period is determined based on one of (i) receiving of a report from the terminal device, (ii) transmitting of a command to the terminal device, or (iii) information for determining the time period transmitted to the terminal device.

In a fifth aspect, there is provided an apparatus. The apparatus comprises means for receiving, at a terminal device and from a network device, a cell activation command for activation of the cell; means for determining a time period for reporting layer 3 (L3) measurement for the activation of the cell based on one of (i) transmitting of a report from the terminal device, (ii) receiving of a command from the network device, or (iii) information for determining the time period received from the network device; and means for transmitting the L3 measurement to the network device if there is uplink resource available within the time period.

In a sixth aspect, there is provided an apparatus. The apparatus comprises means for transmitting, at a network device and to a terminal device, a cell activation command for activation of the cell; and means for receiving a layer 3 (L3) measurement for the activation of the cell from the terminal device within a time period, wherein the time period is determined based on one of (i) receiving of a report from the terminal device, (ii) transmitting of a command to the terminal device, or (iii) information for determining the time period transmitted to the terminal device.

In a seventh aspect, there is provided a non-transitory computer readable medium comprising program instructions for causing an apparatus to perform at least the method according to any one of the above third and fourth aspects.

In a eighth aspect, there is provided a computer program comprising instructions, which, when executed by an apparatus, cause the apparatus to perform at least the method according to any one of the above third and fourth aspects.

In a ninth aspect, there is provided a terminal device. The terminal device comprises: first transmitting circuitry configured to receive, from a network device, a cell activation command for activation of the cell; determine a time period for reporting layer 3 (L3) measurement for the activation of the cell based on one of (i) transmitting of a report from the terminal device, (ii) receiving of a command from the network device, or (iii) information for determining the time period received from the network device; and transmit the L3 measurement to the network device if there is uplink resource available within the time period.

In a tenth aspect, there is provided a network device. The network device comprises: first receiving circuitry configured to transmit, to a terminal device, a cell activation command for activation of the cell; and receive a layer 3 (L3) measurement for the activation of the cell from the terminal device within a time period, wherein the time period is determined based on one of (i) receiving of a report from the terminal device, (ii) transmitting of a command to the terminal device, or (iii) information for determining the time period transmitted to the terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" and "access network device" refer to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. The "network device" may further comprise a core network device, for example, the LMF, the OTT server. It is to be understood that the LMF and OTT are merely examples, and any other suitable forms are also feasible.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As stated above, in NR, as in LTE, a cell can be activated or deactivated. The transitions between activated and deactivated status are mainly based on MAC CE commands from the network e.g. the cell activation/deactivation command. When the UE activates a deactivated cell, it takes time to transition from deactivated to activated status. RAN4 defines the delay requirements within which the UE shall be able to activate a deactivated cell, upon receiving cell activation command in slot n, no later than a time period. In 3GPP TS 38.133, section 8.3.2, it defines that UE shall be able to activate a deactivated cell no later than in slot $$n + \frac{T_{HARQ} + T_{activation\_time} + T_{CSI\_Reporting}}{NR \text{ slot length}}.$$

The 3GPP approved the reduction for the cell activation delay in frequency range 2 (FR2). It was agreed that UE can assist reduction of the activation by sending an L3 measurement to the network after cell activation command. It was agreed to define the time margin for L3 report after cell activation command but the value is not defined.

According to some embodiments of the present disclosure, there is provided a solution for determining a reporting delay for cell activation delay reduction. With this solution, the UE determines a time period to be used for reporting L3 measurement upon cell activation command and transmits L3 report to the network device within the time period. The time period can be determined by several options.

Figure 1A:
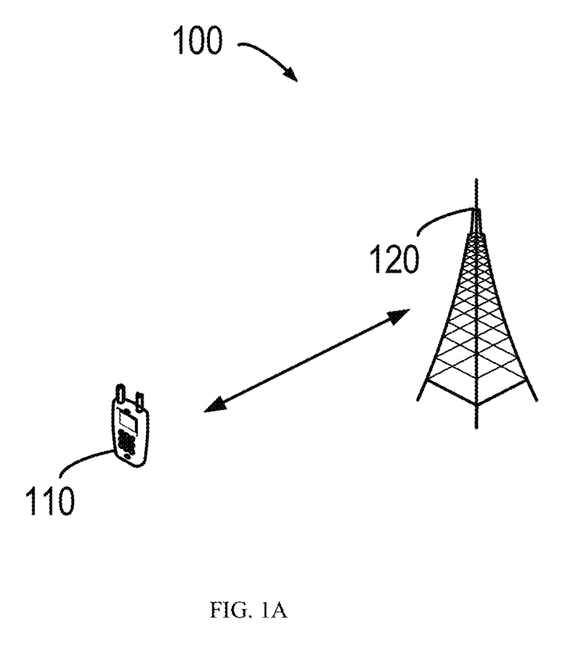
FIG. 1A illustrates an example communication network in which embodiments of the present disclosure may be implemented.

FIG. 1A illustrates a schematic diagram of an example communication network 100 in which some embodiments of the present disclosure can be implemented. As shown in FIG. 1A, the communication network 100 may include terminal device 110 and network device 120.

It is to be understood that the number of network devices and terminal devices is only for the purpose of illustration without suggesting any limitations. The system 100 may include any suitable number of network devices and terminal devices adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 1B:
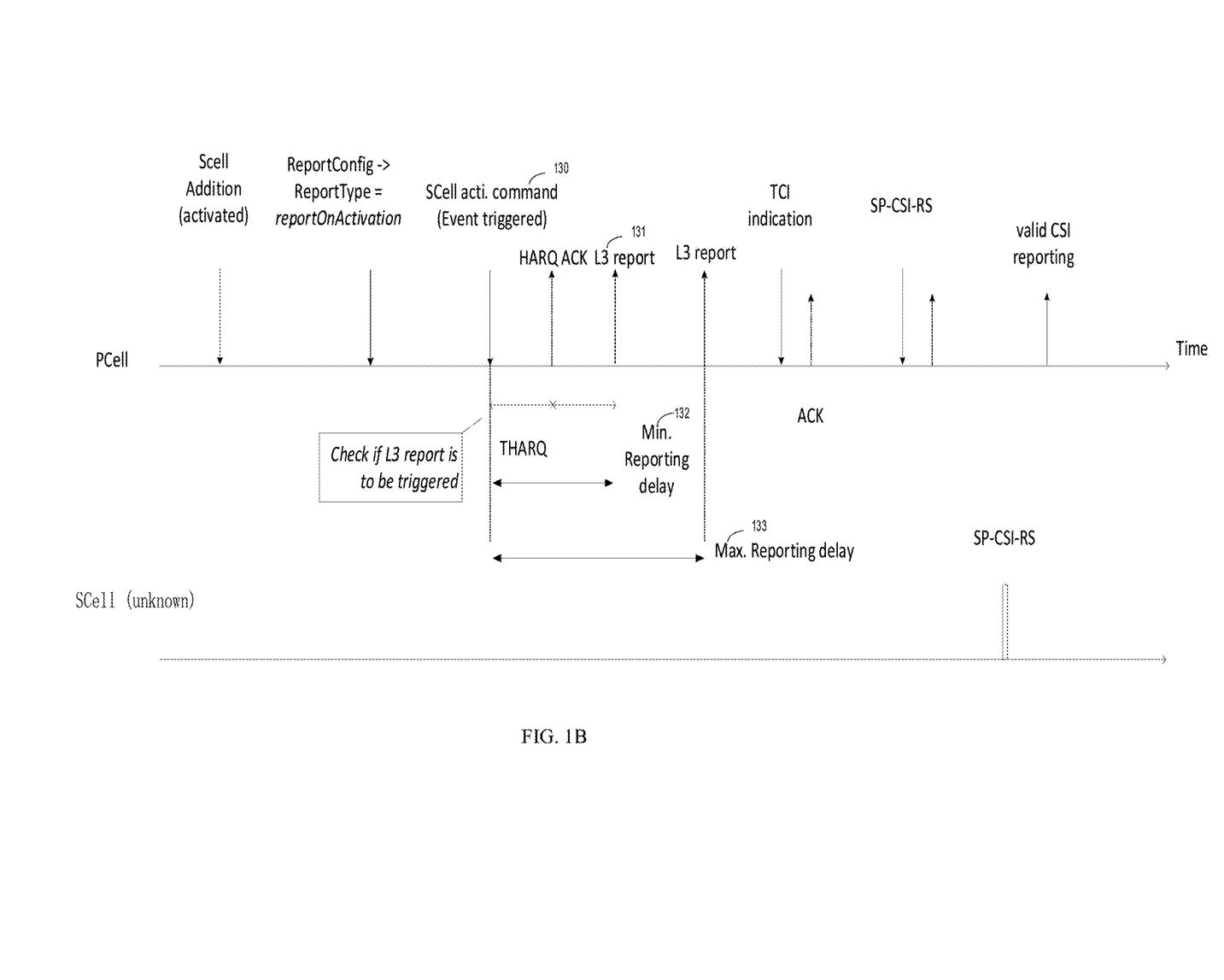
FIG. 1B illustrates an example of cell activation procedure according to some embodiments of the present disclosure.

FIG. 1B illustrates an example of cell activation procedure according to some embodiments of the present disclosure. FIG. 1B shows the L3 reporting delay after the HARQ Ack. As the terminal device would evaluate the validity of available measurement results when receiving the cell activation command 130, the L3 report 131 (if being triggered) will be ready at the time of receiving cell activation command. Hence terminal device does not need additional time to derive the L3 report after cell activation command. In the best case i.e. there is available UL grant, the terminal device shall be able to send the L3 report THARQ+3 ms after cell activation command. This gives the earliest time instant 132 when L3 report can be transmitted. However, from the latest agreement, the terminal device is not required to send L3-RSRP report after exceeding [Y] ms, which is shown as the "Max. Reporting delay" 133. This indicates the latest time instant the terminal device is allowed to send the L3 report. With this time restriction, network may understand the terminal device would not send L3 report. The following embodiments will provide the solutions for determining the Max. Reporting delay 133.

Figure 2:
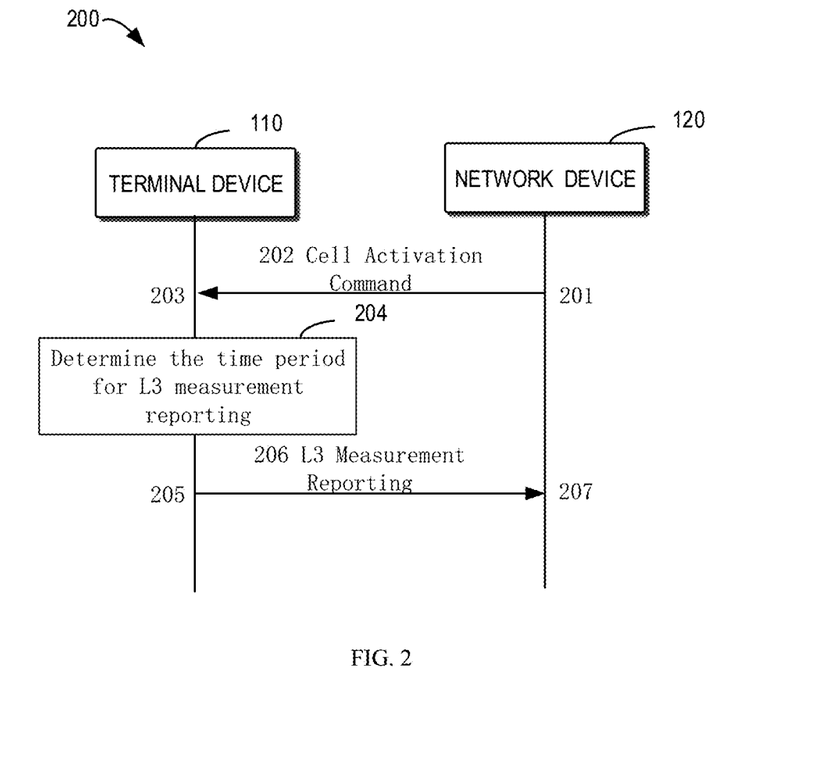
FIG. 2 illustrates a signaling chart illustrating a process for reporting delay according to some embodiments of the present disclosure.

FIG. 2 illustrates a signaling chart illustrating a process for reporting delay according to some embodiments of the present disclosure. For the purpose of discussion, the process 200 will be described with reference to FIG. 1A. The process 200 may involve the terminal devices 110, the network devices 120 as illustrated in FIG. 1A. It would be appreciated that although the process 200 for link has been described in the communication system 100 of FIG. 1A, this process may be likewise applied to other communication scenarios where different network devices are jointly deployed to provide respective serving cells.

As shown in FIG. 2, the terminal device 110 receives 203 cell activation command 202 from the network device 120 for activation of the cell. The terminal device 110 determines 204 a time period for L3 measurement for the activation of the cell based on transmitting of a report from the terminal device 110, or based on receiving of a command from the network device 120, or based on information for determining the time period received from the network device 120. Then the terminal device 110 transmits 205 the L3 measurement 206 to the network device 120 if there is uplink resource available within the time period.

For the solution of the process, the UE determines a time period to be used for L3 measurement upon cell activation command. The time period can be determined by several options.

In some embodiments, the report transmitted from the terminal device 110 is L1-RSRP report. And the end of the time period is a time point when the report is transmitted from the terminal device 110. And the L1-RSRP is a first valid L1-RSRP report after the terminal device receives the cell activation command.

Figure 3:
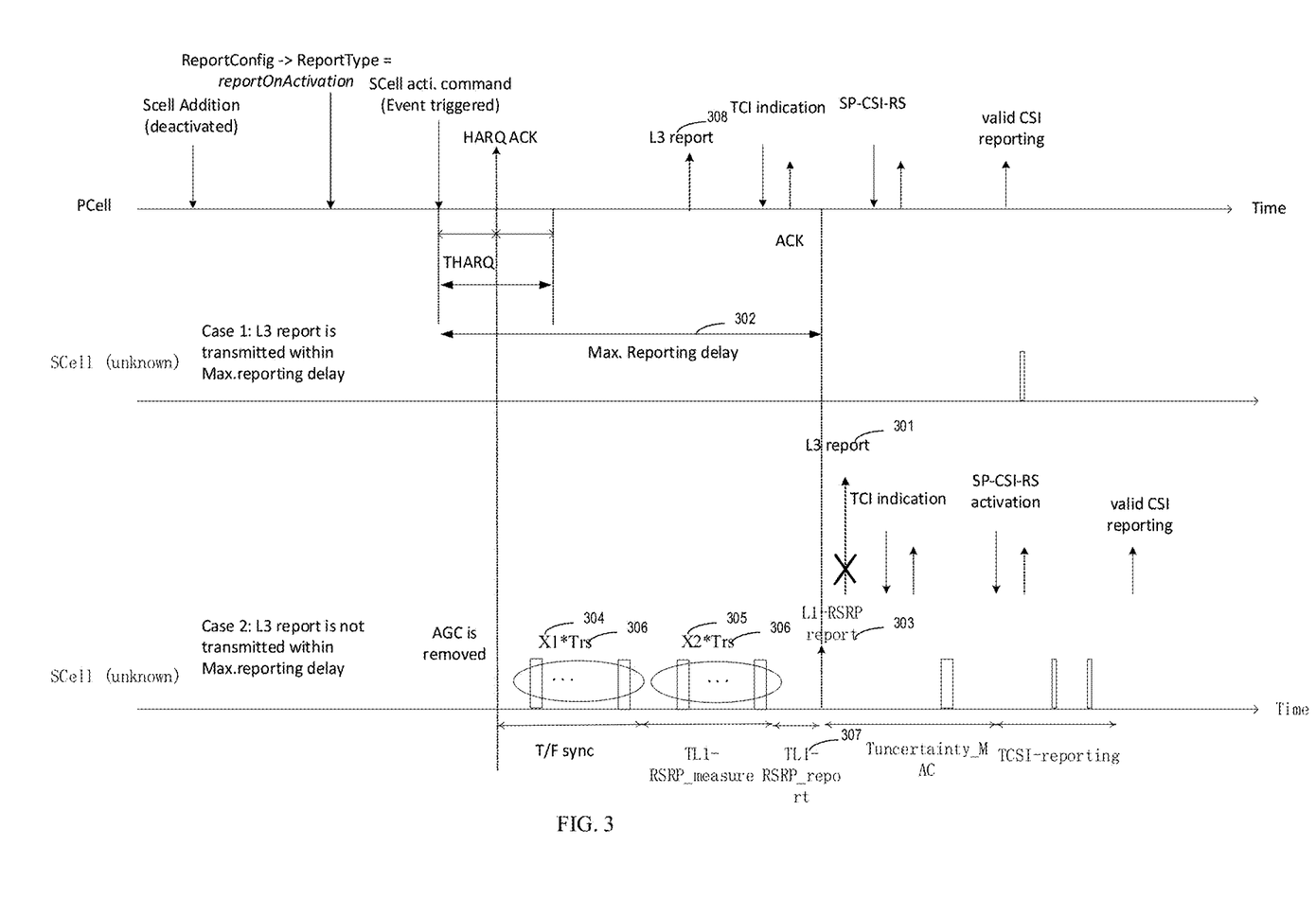
FIG. 3 illustrates an example of reporting delay according to some embodiments of the present disclosure.

FIG. 3 illustrates an example of reporting delay according to some embodiments of the present disclosure. As shown in FIG. 3, the terminal device 110 shall not send L3 report 301 after a certain time period i.e. maximum reporting delay 302 following cell activation command. So the maximum reporting delay 302 represents the time period for L3 measurement reporting. The maximum reporting delay 302 is defined based on when the terminal device 110 sends the first valid L1-RSRP report 303 during cell activation.

In some embodiments, the time period is determined based on a first factor for time/frequency synchronization, a second factor for measurement of L1-RSRP for the report, and a delay of acquiring one or more channel state information (CSI) reporting resources.

As shown in FIG. 3, the maximum reporting delay can be defined as (X1*Trs+X2*Trs+$T_{L1\text{-}RSRP\_report}$), where X1/X2 (304/305) are the smaller sweeping factors used for time/frequency synchronization and L1-RSRP measurement respectively if indicated in terminal device 110 capability. Trs 306 is the value of time for reference signal. Otherwise, if the terminal device 110 capability is not indicated, X1/X2 (304/305) are assumed to be 8. $T_{L1\text{-}RSRP\_report}$ 307 is the delay of acquiring CSI reporting resources.

In addition, as shown in FIG. 3, the terminal device 110 will in parallel perform legacy cell activation procedure e.g. T/F sync, L1-RSRP measurement and L1-RSRP report (for FR2 unknown cell) after receiving cell activation command. Based on this assumption, if the terminal device 110 determines to send L3 report 308 and receives an UL grant within the maximum reporting delay, the terminal device 110 will transmit L3 report 308 on the granted UL resource. Network can determine TC activation command based on the received L3 report.

In some embodiments, the L3 measurement is not transmitted outside the time period. As shown in FIG. 3, if the terminal device 110 does not get the UL grant before the maximum reporting delay, it is expected to send the L1-RSRP report 303 based on the smaller sweeping factors (X1/X2) if being indicated in terminal device 110 capability. The terminal device 110 shall not send L3 report 301 after the maximum reporting delay 302 and network will not grant generic UL resource as earlier for the L3 report 301 and can determine TCI state based on the L1-RSRP report 303.

Figure 4:
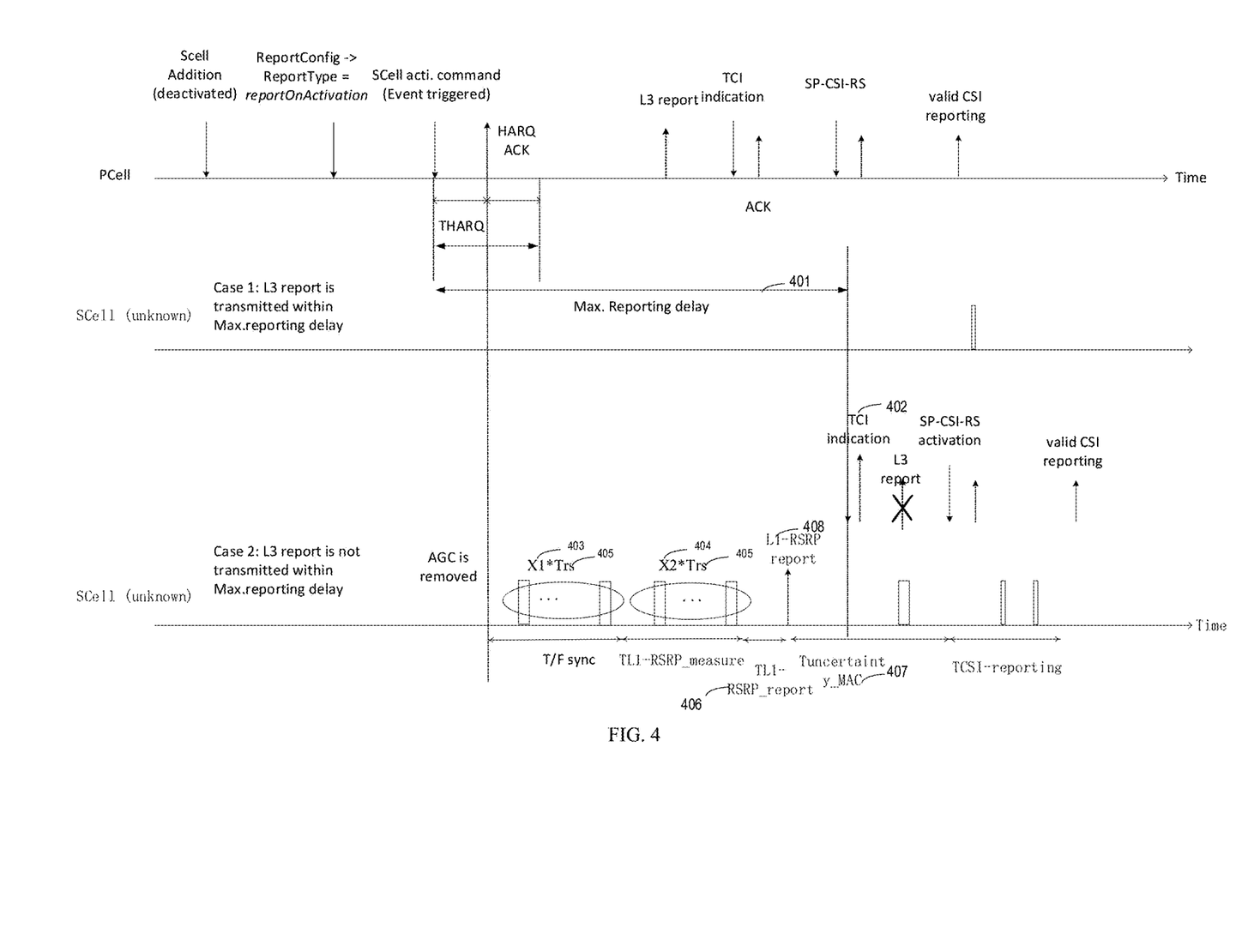
FIG. 4 illustrates another example of reporting delay according to some embodiments of the present disclosure.

In some embodiments, the command received from the network device 120 is a TCI activation command. And an end of the time period is a time point when the command is received from the network device 120.

FIG. 4 illustrates another example of reporting delay according to some embodiments of the present disclosure. As shown in FIG. 4, the maximum reporting delay 401 is defined based on when the terminal device 110 receives the TCI activation command 402 during cell activation.

In some embodiments, the time period is determined based on a first factor for time/frequency synchronization, a second factor for measurement of L1-RSRP, a delay of acquiring one or more CSI reporting resources, and a time period between first valid L1-RSRP reporting and reception of a last TCI activation command.

As shown in FIG. 4, the time period can be defined as (X1*Trs+X2*Trs+$T_{L1\text{-}RSRP\_report}$+$T_{MAC\_uncertainty}$). X1/X2 (403/404) are the smaller sweeping factors used for time/frequency synchronization and L1-RSRP measurement respectively if indicated in terminal device 110 capability. Otherwise, if the terminal device 110 capability is not indicated, X1/X2 (403/404) are assumed to be 8. $T_{L1\text{-}RSRP\_report}$ 406 is the delay of acquiring CSI reporting resources. $T_{uncertainty\_MAC}$ 407 is the time period between reception of the last activation command for physical downlink control channel transmission configuration indicator (PDCCH TCI), physical downlink shared channel transmission configuration indicator (PDSCH TCI) (when applicable) relative to first valid L1-RSRP reporting 408.

The difference from the first option is the max reporting delay is set to the time when TCI activation command is sent, i.e. a longer time period is allowed to send the L3 report. After the terminal device 110 sends L1-RSRP report, the terminal device 110 may still send L3 report before it gets TCI activation command. Then it is up to network implementation if the TCI activation command is determined based on L1-RSRP or L3 report. This provides more flexibility for network to determine the TCI activation command.

As indicated hereinbefore, in some example implementations, the terminal device 110 may determine 204 the time period for L3 measurement for the activation of the cell based on information for determining the time period received from the network device 120. In some embodiments, the information for determining the time period may comprise indication information of the time period or configuration information of the time period. These embodiments will be further described with reference to FIG. 5.

Figure 5:
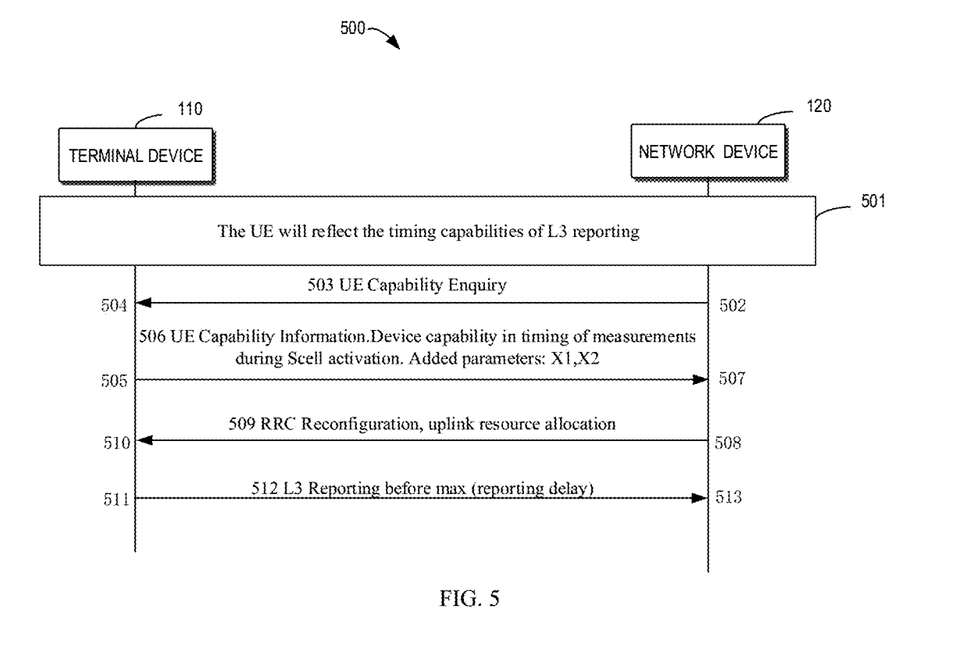
FIG. 5 illustrates a flowchart illustrating an example of controlling timing of the measurement according to some embodiments of the present disclosure.

FIG. 5 illustrates a flowchart illustrating an example of controlling timing of the measurement according to some embodiments of the present disclosure. As show in FIG. 5, the maximum reporting delay can be indicated/configured by network. As the transmission of L3 report depends on when the UL grant is scheduled by network, network may indicate a delay within which network is supposed to schedule the UL grant. Otherwise, network is not supposed to schedule UL grant for the L3 reporting.

In some embodiments, the terminal device 110 transmits timing capabilities of the L3 reporting for cell activation to the network device 120. Then the terminal device 110 receives a capability enquiry from the network device 120. The terminal device 110 transmits capability information of the terminal device 110 to the network device 120. And the capability information comprises a first factor for time/frequency synchronization and a second factor for measurement of L1-RSRP. The terminal device 110 receives a radio resource control (RRC) reconfiguration for uplink resource allocation from the network device 120. The terminal device 110 transmits the L3 report within the time period.

Specifically, At 501, the terminal device 110 will reflect the timing capabilities of L3 reporting at UE registration time. Then the network device 120 sends 502 UE capability enquiry 503 to the terminal device 110. Then terminal device 110 sends 505 UE capability information 506 to the network device 120, which including the parameters X1, X2. The network device 120 sends 508 the RRC reconfiguration 509 to the terminal device 110, which comprises the uplink resource configuration. And the terminal device 110 send 511 L3 measurement report 512 to the network device 120 before the max reporting delay.

According the process shown as FIG. 5, the network device 110 inquires about terminal device 110's capability (in particular, RX beam sweeping factor). Once the terminal device 110 indicates its beam sweeping factor, network device 120 can determine how much time is needed for the time/frequency synchronization and L1-RSRP measurements. Then network device 120 can indicate the maximum delay for sending L3 report, based on [X1, X2], by granting an uplink resource to terminal device 110 for reporting L3 results. Alternatively, the maximum delay can be configured together with configuring L3 reporting after cell activation. Since the maximum reporting delay of L3 results is controlled by the network, a longer period of time can be given to terminal device 110 to send L3 report.

Figure 6:
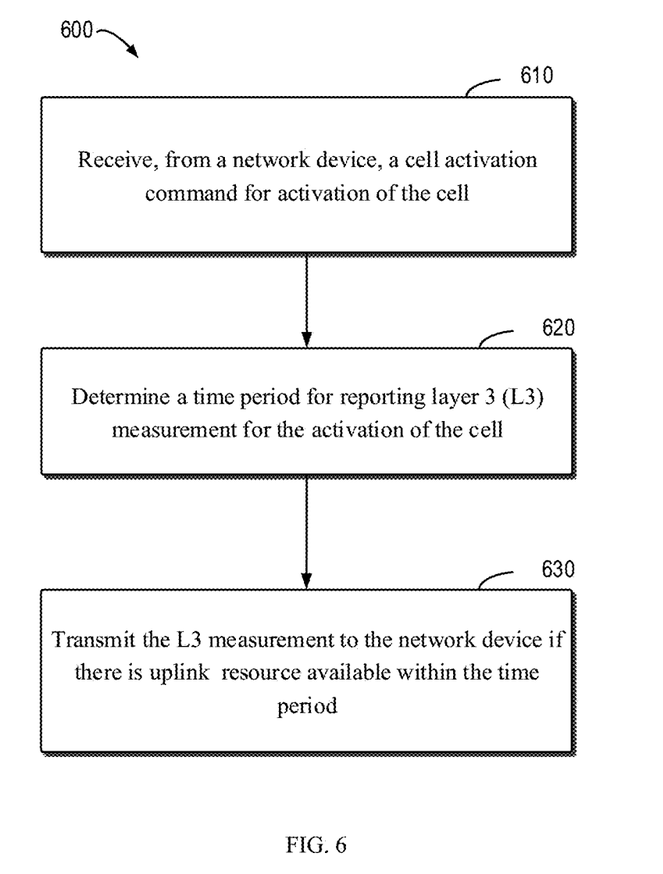
FIG. 6 illustrates a flowchart of a method implemented at a terminal device according to some other embodiments of the present disclosure.

FIG. 6 illustrates a flowchart of a method 600 implemented at a terminal device 110 according to some other embodiments of the present disclosure. For the purpose of discussion, the method 600 will be described from the perspective of the access terminal device 110 with reference to FIG. 1A.

At block 610, the terminal device 110 receive, from a network device 120, a cell activation command for activation of the cell. At block 620, the terminal device 110 determines a time period for L3 measurement for the activation of the cell based on one of (i) transmitting of a report from the terminal device 110, (ii) receiving of a command from the network device 120, or (iii) information for determining the time period received from the network device 120. At block 630, the terminal device 110 transmits the L3 measurement to the network device 120 if there is uplink resource available within the time period.

In some embodiments, the report transmitted from the terminal device 110 is layer 1 reference signal received power (L1-RSRP) report.

In some embodiments, the L1-RSRP is a first valid L1-RSRP report after the terminal device receives the cell activation command.

In some embodiments, the command received from the network device 120 is a transmission configuration indicator (TCI) activation command.

In some embodiments, the information for determining the time period comprises indication information of the time period or configuration information of the time period.

In some embodiments, the L3 measurement is not transmitted outside the time period. An end of the time period is a time point when the report is transmitted from the terminal device 110.

In some embodiments, the time period is determined based on a first factor for time/frequency synchronization, a second factor for measurement of L1-RSRP for the report, and a delay of acquiring one or more channel state information (CSI) reporting resources.

In some embodiments, an end of the time period is a time point when the command is received from the network device 120.

In some embodiments, the time period is determined based on a first factor for time/frequency synchronization, a second factor for measurement of L1-RSRP, a delay of acquiring one or more CSI reporting resources, and a time period between first valid L1-RSRP reporting and reception of a last TCI activation command.

In some embodiments, the terminal device 110 is further caused to: transmit capability information of the terminal device 110 to the network device 120, wherein the capability information comprises a first factor for time/frequency synchronization and a second factor for measurement of L1-RSRP; receive a radio resource control (RRC) reconfiguration for uplink resource allocation from the network device 120; and transmit the L3 report within the time period.

In some embodiments, the cell is a primary cell (PCell) or a secondary cell (SCell).

Figure 7:
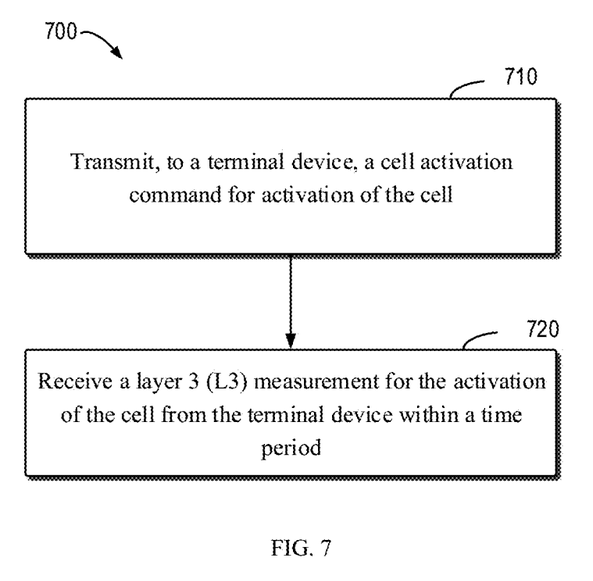
FIG. 7 illustrates a flowchart of a method implemented at a network device according to some other embodiments of the present disclosure.

FIG. 7 shows a flowchart of an example method 700 implemented at a network device 120 in accordance with some embodiments of the present disclosure. For the purpose of discussion, the method 700 will be described from the perspective of the network device 120 with reference to FIG. 1A.

At block 710, the network device 120 transmits, to a terminal device 110, a cell activation command for activation of the cell. At block 720, the network device 120 receives a layer 3 (L3) measurement for the activation of the cell from the terminal device 110 within a time period, wherein the time period is determined based on one of (i) receiving of a report from the terminal device 110, (ii) transmitting of a command to the terminal device 110, or (iii) information for determining the time period transmitted to the terminal device 110.

In some embodiments, the report transmitted from the terminal device 110 is layer 1 reference signal received power (L1-RSRP) report.

In some embodiments, the L1-RSRP is a first valid L1-RSRP report after the terminal device receives the cell activation command.

In some embodiments, the command transmitted to the terminal device 110 is transmission configuration indicator (TCI) activation command.

In some embodiments, the information for determining the time period comprises indication information of the time period or configuration information of the time period.

In some embodiments, the L3 measurement is not received outside the time period.

In some embodiments, an end of the time period is a time point when the report is received from the terminal device 110.

In some embodiments, the time period is determined based on a first factor for time/frequency synchronization, a second factor for measurement of L1-RSRP for the report and a delay of acquiring one or more channel state information (CSI) reporting resources.

In some embodiments, an end of the time period is a time point when the command is transmitted to the terminal device 110.

In some embodiments, the time period is determined based on a first factor for time/frequency synchronization, a second factor for measurement of L1-RSRP, a delay of acquiring one or more CSI reporting resources and a time period between first valid L1-RSRP reporting and transmission of a last TCI activation command.

In some embodiments, the network device 120 is further caused to: receive capability information of the terminal device 110 from the terminal device 110, wherein the capability information comprises a first factor for time/frequency synchronization and a second factor for measurement of L1-RSRP; transmit a radio resource control (RRC) reconfiguration for uplink resource allocation from the network device 120; and receive the L3 report within the time period.

In some embodiments, the cell is a primary cell (PCell) or a secondary cell (SCell).

In some embodiments, an apparatus capable of performing any of the method 600 (for example, the terminal device 110) may comprise means for performing the respective steps of the method 600. The means may be implemented in any suitable form. For example, the means may be implemented in a circuitry or software module.

In some embodiments, the apparatus comprises means for receiving, from a network device 120, a cell activation command for activation of the cell; means for determining a time period for reporting layer 3 (L3) measurement for the activation of the cell based on one of (i) transmitting of a report from the terminal device 110, (ii) receiving of a command from the network device 120, or (iii) information for determining the time period received from the network device 120; and means for transmitting the L3 measurement to the network device 120 if there is uplink resource available within the time period.

In some embodiments, the report transmitted from the terminal device 110 is layer 1 reference signal received power (L1-RSRP) report.

In some embodiments, the L1-RSRP is a first valid L1-RSRP report after the terminal device receives the cell activation command.

In some embodiments, the command received from the network device 120 is a transmission configuration indicator (TCI) activation command.

In some embodiments, the information for determining the time period comprises indication information of the time period or configuration information of the time period.

In some embodiments, the L3 measurement is not transmitted outside the time period.

In some embodiments, an end of the time period is a time point when the report is transmitted from the terminal device 110.

In some embodiments, the time period is determined based on a first factor for time/frequency synchronization, a second factor for measurement of L1-RSRP for the report, and a delay of acquiring one or more channel state information (CSI) reporting resources.

In some embodiments, an end of the time period is a time point when the command is received from the network device 120.

In some embodiments, the time period is determined based on a first factor for time/frequency synchronization, a second factor for measurement of L1-RSRP, a delay of acquiring one or more CSI reporting resources, and a time period between first valid L1-RSRP reporting and reception of a last TCI activation command.

In some embodiments, the apparatus comprises means for transmitting capability information of the terminal device 110 to the network device 120, wherein the capability information comprises a first factor for time/frequency synchronization and a second factor for measurement of L1-RSRP; receiving a radio resource control (RRC) reconfiguration for uplink resource allocation from the network device 120; and transmit the L3 report within the time period.

In some embodiments, the cell is a primary cell (PCell) or a secondary cell (SCell).

In some embodiments, the apparatus further comprises means for performing other steps in some embodiments of the method 600. In some embodiments, the means comprises at least one processor and at least one memory including computer program code, the at least one memory and computer program code configured to, with the at least one processor, cause the performance of the apparatus.

In some embodiments, an apparatus capable of performing any of the method 700 (for example, the network device 120) may comprise means for performing the respective steps of the method 700. The means may be implement in any suitable form. For example, the means may be implemented in a circuitry or software module.

In some embodiments, the apparatus comprises means for transmitting, to a terminal device 110, a cell activation command for activation of the cell; and means for receiving a layer 3 (L3) measurement for the activation of the cell from the terminal device 110 within a time period, wherein the time period is determined based on one of (i) receiving of a report from the terminal device 110, (ii) transmitting of a command to the terminal device 110, or (iii) information for determining the time period transmitted to the terminal device 110.

In some embodiments, the report transmitted from the terminal device 110 is layer 1 reference signal received power (L1-RSRP) report.

In some embodiments, the L1-RSRP is a first valid L1-RSRP report after the terminal device receives the cell activation command.

In some embodiments, the command transmitted to the terminal device 110 is transmission configuration indicator (TCI) activation command.

In some embodiments, the information for determining the time period comprises indication information of the time period or configuration information of the time period.

In some embodiments, the L3 measurement is not received outside the time period.

In some embodiments, an end of the time period is a time point when the report is received from the terminal device 110.

In some embodiments, the time period is determined based on a first factor for time/frequency synchronization, a second factor for measurement of L1-RSRP for the report and a delay of acquiring one or more channel state information (CSI) reporting resources.

In some embodiments, an end of the time period is a time point when the command is transmitted to the terminal device 110.

In some embodiments, the time period is determined based on a first factor for time/frequency synchronization, a second factor for measurement of L1-RSRP, a delay of acquiring one or more CSI reporting resources and a time period between first valid L1-RSRP reporting and transmission of a last TCI activation command.

In some embodiments, the apparatus comprises means for receiving capability information of the terminal device 110 from the terminal device 110, wherein the capability information comprises a first factor for time/frequency synchronization and a second factor for measurement of L1-RSRP; transmitting a radio resource control (RRC) reconfiguration for uplink resource allocation from the network device 120; and receiving the L3 report within the time period.

In some embodiments, the cell is a primary cell (PCell) or a secondary cell (SCell).

Figure 8:
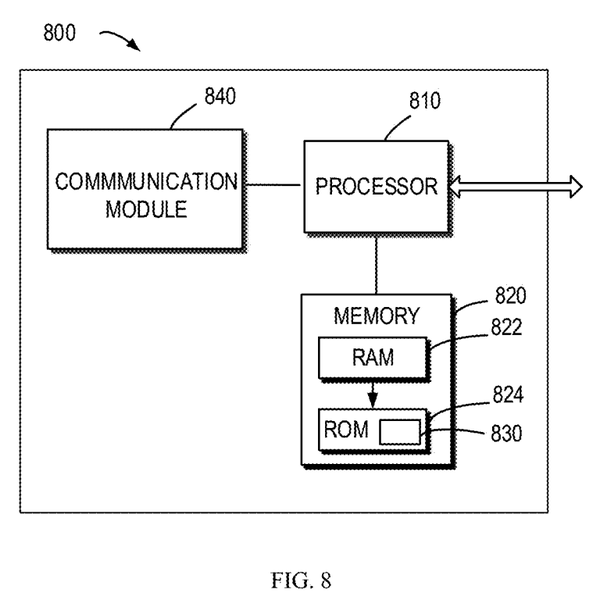
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the communication device, for example the terminal device 110, the network device 120 as shown in FIG. 1A. As shown, the device 800 includes one or more processors 810, one or more memories 840 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 1020. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2 to 7. The embodiments of the present disclosure may also be implemented by hardware or by a combination of software and hardware.

In some embodiments, the program 830 may be tangibly contained in a computer readable medium which may be included in the device 800 (such as in the memory 820) or other storage devices that are accessible by the device 800.

Figure 9:
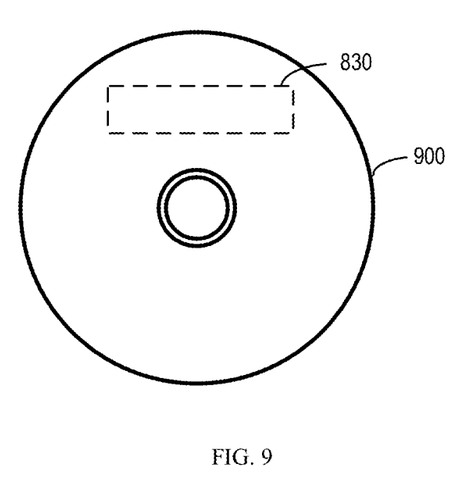
FIG. 9 illustrates a block diagram of an example computer readable medium in accordance with some embodiments of the present disclosure.

The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 600 and 700 as described above with reference to FIGS. 6 and 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
   at least one processor; and
   at least one memory storing instructions that, when executed by the at least one processor, cause the terminal device at least to:
   receive, from a network device, a cell activation command for activation of a cell;
   determine a time period for reporting layer 3 (L3) measurement for the activation of the cell, wherein the time period starts upon receiving the cell activation command and ends at a time point that is based on transmitting of a valid layer 1 reference signal received power (L1-RSRP) report from the terminal device during a cell activation time period;
   transmit the L3 measurement to the network device if there is uplink resource available within the time period during the cell activation time period, wherein the L3 measurement is not transmitted outside the time period;
   receive, from the network device, a transmission configuration indicator (TCI) activation command, which is based on the L3 measurement; and
   transmit a valid channel state information (CSI) report.

2. The terminal device of claim 1, wherein the valid L1-RSRP is a first valid L1-RSRP report after the terminal device receives the cell activation command.

3. The terminal device of claim 1, wherein the information for determining the time period comprises indication information of the time period or configuration information of the time period.

4. The terminal device of claim 1, wherein the time period is determined based on at least one of:
   first factor for time/frequency synchronization,
   a second factor for measurement of L1-RSRP,
   a delay of acquiring one or more channel state information reporting resources, or
   a time period between first valid L1-RSRP reporting and reception of a last TCI activation command.

5. The terminal device of claim 1, wherein the terminal device is further caused to:
   transmit capability information of the terminal device to the network device, wherein the capability information comprises a first factor for time/frequency synchronization and a second factor for measurement of L1-RSRP; and
   transmit the L3 report within the time period.

6. The terminal device of claim 1, wherein the cell is a primary cell (PCell) or a secondary cell (SCell).

7. A network device, comprising:
   at least one processor; and
   at least one memory storing instructions that, when executed by the at least one processor, cause the network device at least to:
   transmit, to a terminal device, a cell activation command for activation of a cell; and
   receive a layer 3 (L3) measurement for the activation of the cell from the terminal device within a time period during a cell activation time period, wherein the time period is determined to start upon receipt of the cell activation command and end at a time point that is based on receiving of a valid layer 1 reference signal received power (L1-RSRP) report from the terminal device during the cell activation time period, wherein the L3 measurement is not received outside the time period;
   transmit, to the terminal device, a transmission configuration indicator (TCI) activation command, which is based on the L3 measurement; and
   receive a valid channel state information (CSI) report.

8. The network device of claim 7, wherein the valid L1-RSRP is a first valid L1-RSRP report after transmitting the cell activation command.

9. The network device of claim 7, wherein the information for determining the time period comprises indication information of the time period or configuration information of the time period.

10. The network device of claim 7, wherein the time period is determined based on at least one of:
    first factor for time/frequency synchronization,
    a second factor for measurement of L1-RSRP,
    a delay of acquiring one or more CSI reporting resources, or
    a time period between first valid L1-RSRP reporting and reception of a last TCI activation command.

11. The network device of claim 7, wherein the network device is further caused to:
    receive capability information of the terminal device from the terminal device, wherein the capability information comprises a first factor for time/frequency synchronization and a second factor for measurement of L1-RSRP;
    transmit a radio resource control (RRC) reconfiguration for uplink resource allocation from the network device; and
    receive the L3 report within the time period.

12. A method, comprising:
   receiving, at a terminal device and from a network device, a cell activation command for activation of a cell;
   determining a time period for reporting layer 3 (L3) measurement for the activation of the cell, wherein the time period starts upon receiving the cell activation command and ends at a time point that is based on transmitting of a valid layer 1 reference signal received power (L1-RSRP) report from the terminal device during a cell activation time period;
   transmitting the L3 measurement to the network device if there is uplink resource available within the time period during a cell activation time period, wherein the L3 measurement is not transmitted outside the time period;
   receiving, from the network device, a transmission configuration indicator (TCI) activation command, which is based on the L3 measurement; and
   transmitting a valid channel state information (CSI) report.

* * * * *